United States Patent
Jing et al.

(10) Patent No.: US 10,674,434 B2
(45) Date of Patent: Jun. 2, 2020

(54) FREQUENCY SPECTRUM PREDICTION METHOD AND APPARATUS FOR COGNITIVE WIRELESS NETWORK

(71) Applicant: Beijing University of Posts and Telecommunications, Beijing (CN)

(72) Inventors: Xiaojun Jing, Beijing (CN); Wei Yang, Beijing (CN); Hai Huang, Beijing (CN)

(73) Assignee: BEIJING UNIVERSITY OF POSTS AND TELECOMMUNICATIONS, Beijing (CN)

(*) Notice: Subject to any disclaimer, the term of this patent is extended or adjusted under 35 U.S.C. 154(b) by 0 days.

(21) Appl. No.: 16/619,207

(22) PCT Filed: Oct. 23, 2017

(86) PCT No.: PCT/CN2017/107314
§ 371 (c)(1),
(2) Date: Dec. 4, 2019

(87) PCT Pub. No.: WO2019/010861
PCT Pub. Date: Jan. 17, 2019

(65) Prior Publication Data
US 2020/0128473 A1    Apr. 23, 2020

(30) Foreign Application Priority Data

Jul. 11, 2017   (CN) .......................... 2017 1 0561832

(51) Int. Cl.
*H04W 48/06*   (2009.01)
*H04W 24/08*   (2009.01)
(Continued)

(52) U.S. Cl.
CPC ........ *H04W 48/06* (2013.01); *H04B 17/3913* (2015.01); *H04W 24/08* (2013.01);
(Continued)

(58) Field of Classification Search
CPC . H04W 48/06; H04W 24/08; H04W 28/0289; H04W 40/12; H04W 40/18;
(Continued)

(56) References Cited

U.S. PATENT DOCUMENTS 10,444,322 B2 * 10/2019 Miller .................. G01S 5/0226
2015/0124972 A1    5/2015 Ramo et al.
(Continued)

FOREIGN PATENT DOCUMENTS

CN    106507370 A   3/2017
EP      2753036 A1   7/2014

OTHER PUBLICATIONS

Song, Guolin et al., A Kind of Wireless Communication Signals Ultra Narrow-band Filtering Method Improvement; Science Technology and Engineering; Oct. 31, 2016, ISSN: 1671-1815, vol. 16 No. 30, Oct. 2016, pp. 253 and 254.
(Continued)

*Primary Examiner* — Mounir Moutaouakil
(74) *Attorney, Agent, or Firm* — Clements Bernard Walker

(57) ABSTRACT

The embodiment of the present application provides a method and apparatus for spectrum prediction in a cognitive radio network. The method comprises: receiving a target access request from a secondary user; obtaining real-time occupancy information of bands through a subspace filtering-based spectrum sensing approach; updating a spectrum resource database of radio environment maps (REM) according to the real-time occupancy information of bands; establishing a prediction model for bands occupied by primary users according to the updated spectrum resource database of radio environment maps (REM); and allowing an access of the secondary user to a target band according to the prediction model for bands occupied by primary users.

(Continued)

The method and apparatus provided by embodiments of the present application allow a secondary user to have a targeted spectrum access. The spectrum utilization efficiency of the radio network can thus be improved.

8 Claims, 3 Drawing Sheets

(51) Int. Cl.
| | |
|---|---|
| *H04B 17/391* | (2015.01) |
| *H04W 48/16* | (2009.01) |
| *H04W 28/02* | (2009.01) |
| *H04W 40/18* | (2009.01) |
| *H04B 17/382* | (2015.01) |
| *H04L 12/911* | (2013.01) |

(52) U.S. Cl.
CPC ........... *H04W 48/16* (2013.01); *H04B 17/382* (2015.01); *H04L 47/823* (2013.01); *H04W 28/0289* (2013.01); *H04W 40/18* (2013.01)

(58) Field of Classification Search
CPC . H04W 48/16; H04B 17/3913; H04B 17/382; H04L 47/823
See application file for complete search history.

(56) References Cited

U.S. PATENT DOCUMENTS

| | | | |
|---|---|---|---|
| 2015/0181436 A1 | 6/2015 | Kathuria et al. | |
| 2016/0127058 A1* | 5/2016 | Souvik | H04B 17/391 370/329 |
| 2017/0030996 A1* | 2/2017 | Fireaizen | G01S 5/02 |
| 2017/0074980 A1* | 3/2017 | Adib | G01S 7/35 |
| 2019/0159048 A1* | 5/2019 | Feldkamp | H04L 41/145 |
| 2019/0260752 A1* | 8/2019 | Thexton | H04L 63/102 |
| 2019/0364492 A1* | 11/2019 | Azizi | H04W 24/08 |

OTHER PUBLICATIONS

International Search Report for International Application No. PCT/CN2017/107314 dated Mar. 30, 2018.

* cited by examiner

FREQUENCY SPECTRUM PREDICTION METHOD AND APPARATUS FOR COGNITIVE WIRELESS NETWORK

The present application claims priority to Chinese patent application No. 201710561832.4, filed with the China National Intellectual Property Administration on Jul. 11, 2017, and entitled "Frequency Spectrum Prediction Method and Apparatus For Cognitive Wireless Network", the content of which is incorporated into the present disclosure by reference in its entirety.

TECHNICAL FIELD

The present application refers to the field of cognitive radio networks, and in particular, to a method and apparatus for spectrum prediction in a cognitive radio network.

BACKGROUND

Spectrum sensing is a key technology in present cognitive radio networks, and would also be crucial in future smart antenna systems, military communication and interference countermeasure. As a kind of radio technology which aims to improve utilization rate of spectrum resources, cognitive radio mainly provides solutions for two challenges. One challenge is that wireless spectrum resources available for allocation are scarce and decreasing continuously. Another challenge is the rather low utilization rate of authorized spectrum. A survey from Federal Communications Commission reveals that, in most cases, the utilization rate is around 10%. This is a huge waste of spectrum resources.

For the reasons above, cognitive radio is developed and promoted. Cognitive radio is a form of wireless communication in which a radio capable of spectrum sensing can temporarily use vacant authorized channels for communication without interference on normal communication of primary users (i.e., authorized users). In this way, utilization rate of spectrum can be improved. Therefore, the prediction of spectrums occupied by primary users is important in cognitive radio networks and remains a pressing issue to be solved.

In prior art, in the case where a primary user has accessed to cognitive radio network, a secondary user typically scans the whole band. This kind of spectrum access is aimless and its accuracy is very low.

SUMMARY

Embodiments of the present application provide a method and apparatus for spectrum prediction in a cognitive radio network, which allows a secondary user to have a targeted spectrum access. As such, the spectrum utilization rate of the radio network can be improved.

Specifically, the following aspects are disclosed in the present application.

A method for spectrum prediction in a cognitive radio network is provided, comprising:
  receiving a target access request from a secondary user;
  obtaining real-time occupancy information of bands through a subspace filtering-based spectrum sensing approach;
  updating a spectrum resource database of radio environment maps (REM) according to the real-time occupancy information of bands;
  establishing a prediction model for bands occupied by primary users according to the updated spectrum resource database of radio environment maps (REM); and
  allowing an access of the secondary user to a target band according to the prediction model for bands occupied by primary users.

Furthermore, obtaining real-time occupancy information of bands through a subspace filtering-based spectrum sensing approach comprising:
  obtaining a detection probability $P_d(\varepsilon, \tau)$ and a false alarm probability $P_f(\varepsilon, \tau)$ of a band through a subspace filtering-based spectrum sensing approach; wherein, $$P_d(\varepsilon, \tau) = P\left(\frac{1}{N}\sum_{n=1}^{N}|y(n)|^2 > \varepsilon \mid H_1\right)$$

$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^{N}|u_1(n)|^2 > \varepsilon \mid H_0\right)$$

$$= Q\left((\varepsilon - \mu_0)/\sqrt{\sigma_0^2}\right)$$

$\mu_0$ is an expectation for the spectrum sensing, and $\mu_0 = \sigma_u^2$; $\sigma_0^2$ is a variance for spectrum sensing, and $\sigma_0^2 = \sigma_u^4/N$; $\sigma_u^2$ is a variance of noise; $Q(x)$ is a complementary cumulative distribution function in a standard normal distribution, and $$Q(x) = \frac{1}{\sqrt{2\pi}}\int_x^\infty \exp(-t^2/2);$$

t is an energy of a signal received by the secondary user; N is the number of samples of primary users; $H_1$ indicates a case where a main signal s(t) exists; $H_0$ indicates a case where a radio band is not occupied by the primary users; y(n) is a signal observed after being sampled by a receiver; n is the number of samples at a signal receiving end; γ is a ratio of a variance of the signal to a variance of subspace-filtered noise; ε is a preset energy threshold; τ is duration for spectrum sensing; $f_s$ is a sampling frequency of the secondary user; and $u_1(n)$ is residual noise after the subspace filtering; and
  obtaining real-time occupancy information of a band with the detection probability and false alarm probability.

Further, establishing a prediction model for bands occupied by primary users according to the updated spectrum resource database of radio environment maps (REM) comprises:
  after a target primary user's access to a band is allowed, searching, in the updated spectrum resource database of radio environment maps (REM), for all users whose access time is in proximity to that of the target primary user, and recording all the users as found into a set A wherein the spectrum resource database comprises names, access time, access bands, geographical locations, access routines and band occupation of all users;
  training all the users in the set A, determining accessing users that best accord with normal access behavior of the target primary user according to proximity in time, and recording the accessing users into a set B;
  determining whether access behaviors of users in the set B obtained through training accord with the access behavior of the target primary user;

if access behaviors of users in the set B do not accord with the access behavior of the target primary user, proceeding back to the step of after a target primary user's access to a band is allowed, searching, in the updated spectrum resource database of radio environment maps (REM), for all users whose access time is in proximity to that of the target primary user;

if access behaviors of users in the set B accord with the access behavior of the target primary user, searching, in the set B, for users whose geographic location difference with the target primary user is less than a preset value, recording these users into a set C, and calculating time intervals between the access band of the target primary user and access bands of the users in the set C;

correcting the users in the set C according to a correction rule and users according with an access regularity of the target primary user;

predicting an access routine of the target primary user according to the corrected users in the set C; and establishing the prediction model for bands occupied by primary users according to the predicted access routine of the target primary user.

Furthermore, allowing an access of the secondary user to a target band according to the prediction model for bands occupied by primary users comprises:

determining, according to the prediction model for bands occupied by primary users, whether the target band is occupied by any user at access time contained in the access request;

if the target frequency is not occupied, allowing the access of the secondary user to the target band; and if the target frequency is occupied, returning to step of determining, according to the prediction model for bands occupied by primary users, whether the target band is occupied by any user at access time contained in the access request.

In addition, an apparatus for spectrum prediction in a cognitive radio network is provided, comprising:

a request access module, configured for receiving a target access request from a secondary user;

a spectrum real-time occupancy information obtaining module, configured for obtaining real-time occupancy information of bands through a subspace filtering-based spectrum sensing approach;

a resource library establishing module, configured for updating a spectrum resource database of radio environment maps (REM) according to the real-time occupancy information of bands;

a model obtaining module, configured for establishing a prediction model for bands occupied by primary users according to the updated spectrum resource database of radio environment maps (REM); and an access behavior module, configure for allowing an access of the secondary user to a target band according to the prediction model for bands occupied by primary users.

Furthermore, the spectrum real-time occupancy information obtaining module comprises: a detection and false alarm probability obtaining sub-module, configured for obtaining a detection probability $P_d(\varepsilon, \tau)$ and a false alarm probability $P_f(\varepsilon, \tau)$ of a band through a subspace filtering-based spectrum sensing approach; wherein, $$P_d(\varepsilon, \tau) = P\left(\frac{1}{N}\sum_{n=1}^{N}|y(n)|^2 > \varepsilon \mid H_1\right)$$

$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^{N}|u_1(n)|^2 > \varepsilon \mid H_0\right)$$

$$= Q\left((\varepsilon - \mu_0)/\sqrt{\sigma_0^2}\right)$$

$\mu_0$ is an expectation for the spectrum sensing, and $\mu_0 = \sigma_u^2$; $\sigma_0^2$ is a variance for spectrum sensing, and $\sigma_0^2 = \sigma_u^4/N$; $\sigma_u^2$, is a variance of noise; $Q(x)$ is a complementary cumulative distribution function in a standard normal distribution, and $$Q(x) = \frac{1}{\sqrt{2\pi}}\int_x^{\infty} \exp(-t^2/2);$$

t is an energy of a signal received by the secondary user; N is the number of samples of primary users; $H_1$ indicates a case where a main signal s(t) exists; $H_0$ indicates a case where a radio band is not occupied by the primary users; y(n) is a signal observed after being sampled by a receiver; n is the number of samples at a signal receiving end; $\gamma$ is a ratio of a variance of the signal to a variance of subspace-filtered noise; $\varepsilon$ is a preset energy threshold; $\tau$ is duration for spectrum sensing; $f_s$ is a sampling frequency of the secondary user; and $u_1(n)$ is residual noise after the subspace filtering; and a real-time occupancy information obtaining sub-module, configured for obtaining real-time occupancy information of a band with the detection probability and false alarm probability.

Furthermore, the model obtaining module comprises:

a user searching sub-module, configured for, after a target primary user's access to a band is allowed, searching, in the updated spectrum resource database of radio environment maps (REM), for all users whose access time is in proximity to that of the target primary user, and recording all the users as found into a set A, wherein the spectrum resource database comprises names, access time, access bands, geographical locations, access routines and band occupation of all users;

a user confirmation sub-module, configured for training all the users in the set A, determining accessing users that best accord with normal access behavior of the target primary user according to proximity in time, and recording the accessing users into a set B;

a first determining sub-module, configured for determining whether access behaviors of users in the set B obtained through training accord with the access behavior of the target primary user; if not accord with, activating a first returning sub-module, and if accord with, activating a calculation sub-module;

a first returning sub-module, configure for, proceeding back to the step of after a target primary user's access to a band is allowed, searching, in the updated spectrum resource database of radio environment maps (REM), for all users having access time in proximity to that of the target primary user;

a calculation sub-module, configured for, searching, in the set B, for users whose geographic location difference with the target primary user is less than a preset value, recording these users into a set C, and calculating time intervals between the access band of the target primary user and access bands of the users in the set C;

a correction sub-module, configured for correcting the users in the set C according to a correction rule and users according with an access regularity of the target primary user;

a prediction sub-module, configured for predicting an access routine of the target primary user according to the corrected users in the set C; and a prediction model establishing sub-module, configured for establishing the prediction model for bands occupied by primary users according to the predicted access routine of the target primary user.

Furthermore, the access behavior module comprises:

a second determining sub-module, configured for determining, according to the prediction model for bands occupied by primary users, whether the target band is occupied by any user at access time contained in the access request; if not occupied, activating a secondary user access sub-module, and if occupied, activating a second returning sub-module;

a secondary user access sub-module, configured for allowing the access of the secondary user to the target band; and a second returning sub-module, configured for proceeding back to step of determining, according to the prediction model for bands occupied by primary users, whether the target band is occupied by any user at access time contained in the access request.

In another aspect of the present application; embodiments provide a computer readable storage medium having instructions stored thereon which, when executed by a computer, cause the computer to perform any of the methods for spectrum prediction in a cognitive radio network as described above.

In yet another aspect of the present application, embodiments provide a computer program product having instructions which, when executed by a computer, cause the computer to perform any of the methods for spectrum prediction in a cognitive radio network as described above.

In the method for spectrum prediction in a cognitive radio network as provided by embodiments of the present application, real-time occupancy information of bands can be obtained through a subspace filtering-based spectrum sensing approach. A spectrum resource database of radio environment maps (REM) can be updated according to the real-time occupancy information of bands. A prediction model for bands occupied by primary users is established according to the updated spectrum resource database of radio environment maps (REM). The secondary user can thus access to a target band according to the prediction model for bands occupied by primary users. As such, a secondary user has a targeted spectrum access. The spectrum utilization efficiency of the radio network can thus be improved. Of course, it is appreciated that any product or method provided in embodiments of the present application does not necessarily have all the advantages described above.

BRIEF DESCRIPTION OF THE DRAWINGS in order to more clearly describe the technical solutions in embodiments of present application and prior art, accompanying drawings that need to be used in embodiments and prior art will be briefly described below. Obviously, accompanying drawings depict only some embodiments of the present application. Those skilled in the art may also obtain other accompanying drawings based on these accompanying drawings without any creative efforts.

DETAILED DESCRIPTION

To make the objectives, technical solutions, and advantages of the present application more comprehensible, a detailed description of the present disclosure is provided below in association with examples and with reference to drawings. Obviously, the described embodiments illustrate only some but not all the implementations of the present application. Any other embodiment obtained therefrom by those skilled in the art without any creative efforts falls within the scope of the present application.

A detailed description of the present disclosure is provided below in association with examples and with reference to drawings. Obviously, the described embodiments illustrate only some but not all the implementations of the present application. Any other embodiment obtained therefrom by those skilled in the art without any creative efforts falls within the scope of the present application.

Figure 1:
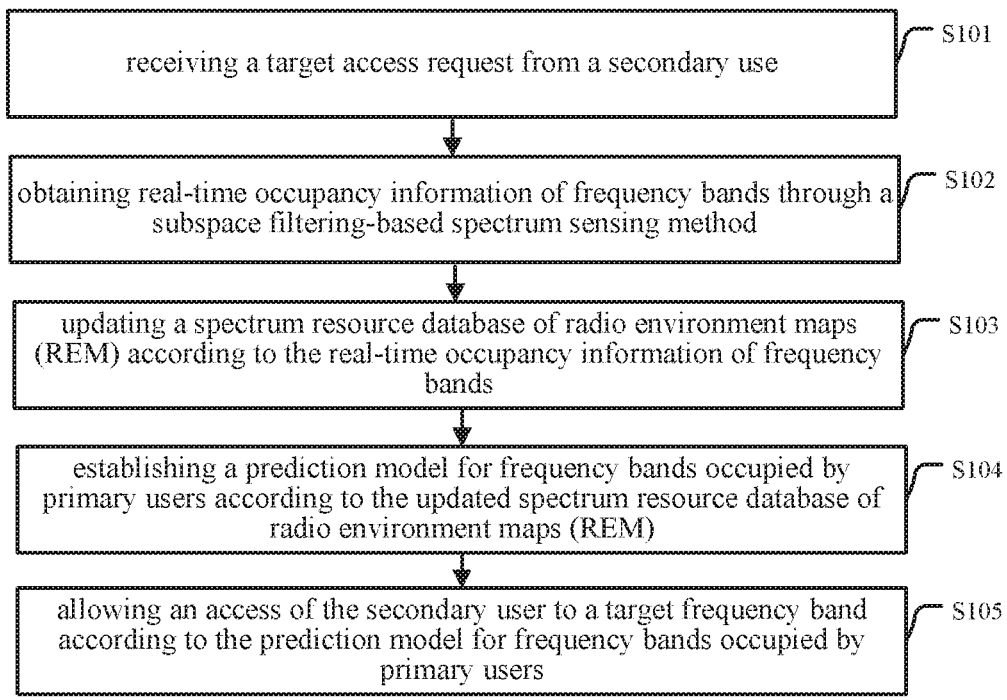
FIG. 1 is a flowchart of a method for spectrum prediction in a cognitive radio network according to an embodiment of the present application.

FIG. 1 is a flowchart of a first method for spectrum prediction in a cognitive radio network according to an embodiment of the present application. The method comprises the following operations.

At S101, a target access request is received from a secondary user.

A primary user is a user authorized to utilize a specific band in a cognitive radio network, A secondary user is a user not authorized to utilize a specific band in the cognitive radio network.

It should be noted that the method of the present application may be implemented on a base station.

At S102, real-time occupancy information of bands is obtained through a subspace filtering-based spectrum sensing approach.

The real-time occupancy information may comprise access time, access bands and geographical locations.

Specifically, in this step, the real-time occupancy information of bands can be obtained through a subspace filtering-based spectrum sensing approach according to the received target access request of the secondary user.

A cognitive user may acquire knowledge of spectrum usage in a cognitive radio network through various signal detection and processing means. Among the functional layers of a radio network, the spectrum sensing technology generally relates to the physical layer and the link layer. In physical layer, interest is primarily placed on various specific local detection algorithms. In link layer, however, interest is primarily placed on user collaboration, and some other aspects such as local awareness, collaboration awareness, and optimization of awareness mechanism.

For clarity, a brief description of the subspace filtering-based spectrum sensing approach is provided below.

Subspace filtering is an active noise reduction approach, the essence of which is decomposing, after construction of a linear estimator H, a received signal r(n) into two orthogonal subspaces: a signal noise subspace Hy(n) and a noise subspace (I−H)r(n) wherein, y(n) is a signal (including signal and noise) as observed after sampling by a receiver. I is a unit matrix having the same dimension as H, and is composed by the signal noise subspace and the noise subspace. Therefore, the noise subspace can be represented as (I−H). The noise subspace contains only noise, while the signal noise subspace contains segmented noise and the entire signal, n is the number of samples at a signal receiving end. After the removal of all the noise in the noise subspace and the signal noise subspace, an optimal subspace filtering ŷ(n) that can be represented as:

$$\hat{y}(n) = Hy(n) \quad (1)$$

Therefore, the optimal subspace filtering is primarily directed to obtain an optimal linear estimator $H_{opt}$. The optimal linear estimator $H_{opt}$ may minimize signal distortion and make the residual noise smaller than a preset threshold, that is $$\begin{cases} \min \overline{\varepsilon_s^2} \\ \overline{\varepsilon_u^2} < \Delta_{th} \end{cases} \quad (2)$$

wherein, $\varepsilon_s$ is a distorted signal, $\overline{\varepsilon_s^2}$, is an average power of the distortion signal, and $\Delta_{th}$ is a preset threshold.

As background noise is white noise, covariance matrix $R_r$ of the received signal can be expressed as a sum of a signal covariance matrix $R_s$ and a noise covariance matrix $R_u$:

$$R_r = R_s + R_u \quad (3)$$

$R_s$ and $R_u$ has the same eigenvector matrix V. Therefore, matrix $R_r$ may be eigen-decomposed as:

$$R_r = V\Lambda_r V^T \quad (4)$$

wherein, $\Lambda_r$ is a vector matrix composed of eigenvalues $\lambda_1, \ldots, \lambda_N$. $\Lambda_r = \text{diag}[\lambda_1, \ldots, \lambda_k, \ldots \lambda_N]$ and comprises all eigenvalues of the matrix $R_r$. If the eigenvalues are arranged in a descending order of $\lambda_1 \geq \ldots \geq \lambda_k \geq \ldots \geq \lambda_N$, $\lambda_k > \sigma^2$, we have $\lambda_k > \sigma^2$, then k=1, 2, ..., K, and $\lambda_{K+1} = \ldots = \lambda_N = \sigma^2$. $\lambda_k > \sigma^2$ represents a signal subspace, the rest represents a noise subspace. Therefore, the signal covariance matrix $R_s$ and the noise covariance matrix $R_u$ in equation (3) can be respectively expressed as:

$$R_s = V\Lambda_s V^T \quad (5)$$
$$= V \begin{bmatrix} \lambda_1 & & & \\ & \ddots & & O \\ & & \lambda_K & \\ & O & & 0 \end{bmatrix} V_T$$

$$R_u = V\Lambda_u V^T \quad (6)$$
$$= V \begin{bmatrix} 0 & & & \\ & \lambda_{K+1} & & \\ & & \ddots & O \\ & & & \lambda_N \end{bmatrix} V_T$$

Therefore, $H_{opt}$ may be equivalently expressed in approximation as:

$$H_{opt} = V\Lambda_r(\Lambda_r + \mu\Lambda_r)^{-1}V^{-1} \quad (7)$$

wherein, μ is Lagrangian constant.

In practical applications, the above covariance matrix $R_r$ cannot be obtained. Therefore, the matrix can be replaced by a covariance matrix of samples:

$$R_r \approx \frac{1}{N-1}\sum_{i=1}^{N} r(i)r(i)^T \quad (8)$$

wherein, i is the numeral of each sample, N is the total number of samples, i and N are both natural numbers.

In theory, after removal of background noise through the subspace filtering approach, the remaining portion can be expressed as:

$$\begin{cases} \hat{r}(n) + H_{opt}r(n) \approx s(n), H_1 \\ \hat{r}(n) \approx 0, H_0 \end{cases} \quad (9)$$

Assuming that energy $E_s$ of the signal s(n) is defined as $$E_s = E(|s(n)|^2) \approx E(|H_{opt}s(n)|^2) \quad (10)$$

then the corresponding detection probability $P_d$ and false alarm probability $P_f$ can be expressed as:

$$P_d = P(E(|H_{opt}r(n)|_2) > 0|H_1) \quad (11)$$

$$P_f = P(E(|H_{opt}r(n)|_2) > 0|H_0) \quad (12)$$

The spectrum sensing is a binary hypothesis problem. A signal received by the receiver can be expressed as:

$$H_1: r(t) = s(t) + u(t)$$

$$H_0: r(t) = u(t)$$

wherein, $H_1$ indicates the case where a main signal s(t) exists, and $H_0$ indicates the case where a radio band of interest is not occupied.

After being sampled at the receiving end, signals as observed in the above two cases can be rewritten as:

$$H_1: r(n) = s(n) + u(n)$$

$$H_0: r(n) = u(n)$$

Under the ideal case where background noise is completely removed through the subspace filtering, equations (11) and (12) provide good outcomes. However, there may be some ambient noise in the residual signal after subspace filtering. Therefore, equations (11) and (12) may produce errors in the estimation of the detection probability and false alarm probability.

According to central limit theorem, we assume that residuals after subspace filtering still obey an independent and identically distributed Gaussian distribution. As distribution of subspace-filtered noise is related to the variance and average value of Gaussian distribution, a corrected detection probability $P_d(\varepsilon, \tau)$ can be expressed as:

$$P_d(\varepsilon, \tau) = P\left(\frac{1}{N}\sum_{n=1}^{N}|y(n)|^2 > \varepsilon \mid H_1\right) \quad (13)$$

$$= Q\left(\left(\frac{\varepsilon}{\sigma_u^2} - 1 - \gamma\right)\sqrt{\frac{\tau f_s}{2\gamma + 1}}\right)$$

$$Q(x) = \frac{1}{\sqrt{2\pi}} \int_x^\infty \exp(-t^2/2) \quad (14)$$

wherein, $\tau$ represents a duration for spectrum sensing, t is the energy of the signal received by the secondary user, $f_s$ is sampling frequency of the secondary user, $N=\tau f_s$ is the number of samples of primary users, $\gamma$ is a ratio of the variance of the signal to the variance of subspace-filtered noise, $\varepsilon$ is a preset energy threshold, $$\gamma = \frac{\sigma_s^2}{\sigma_u^2},$$

and $\sigma_u^2$ is the variance of subspace-filtered noise.

Accordingly, the false alarm probability $P_f(\varepsilon, \tau)$ can be expressed as:

$$P_f(\varepsilon, \tau) = P\left(\frac{1}{N}\sum_{n=1}^N |u_1(n)|^2 > \varepsilon \mid H_0\right) \quad (15)$$

$$= Q\left((\varepsilon - \mu_0)/\sqrt{\sigma_0^2}\right)$$

wherein, $\mu_0$ is the expectation for spectrum sensing, and $\mu_0=\sigma_u^2$; $\sigma_0^2$ is the variance for spectrum sensing, and $\sigma_0^2=\sigma_u^4/N$; $u_1(n)$ is residual noise after subspace filtering, and $\sigma_u^2$ is the variance of noise.

The detection probability and the false alarm probability indicate, to some extent, a sensing error that the system can tolerate. In case of different detection probabilities and false alarm probabilities, the system has different sensing accuracies. The purpose of spectrum sensing is to maximize the detection probability for a certain false alarm probability, that is, to detect a band occupied by a primary user as accurately as possible.

Figure 2:
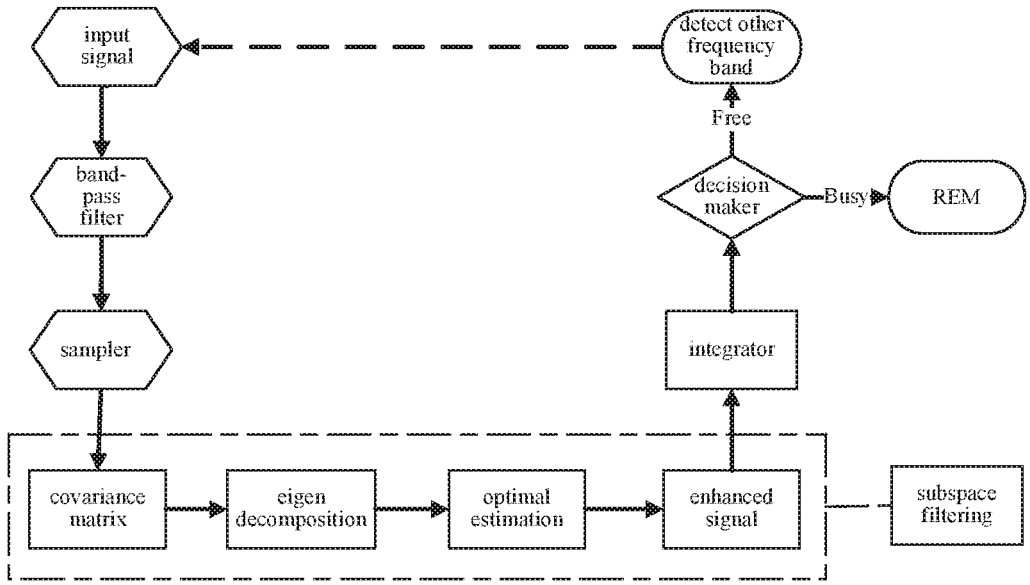
FIG. 2 is a flowchart of a subspace filtering-based spectrum sensing according to an embodiment of the present application.

As shown in FIG. 2, the process of a subspace filtering-based spectrum sensing comprises the following steps. A signal observed by a secondary user is inputted. The observed signal is filtered with a band-pass filter so as to obtain a band-pass signal. An enhanced signal is obtained through subspace filtering with a sampler. A determination is made, by a decision maker, as to whether current radio network band is being occupied. If it is occupied, the current radio network band is stored and REM database is updated. If it is not occupied, the secondary user is allowed to access to the band, and the detection proceeds to the next band.

FIG. 2 describes process of a subspace filtering-based spectrum sensing. The subspace filtering corresponding to the equations (1) to (7) is represented by the blocks in the dotted box. Decision of the decision maker is based on the mathematical analysis in the equations (11) to (15). It is noted that, if the decision maker determines that current band of the cognitive radio network is being occupied, the system proceeds to perform spectrum sensing on another band within a certain period.

Specifically, through the subspace filtering-based spectrum sensing approach, the detection probability $P_d(\varepsilon, \tau)$ and false alarm probability $P_f(\varepsilon, \tau)$ of a band are obtained as $$P_d(\varepsilon, \tau) = P\left(\frac{1}{N}\sum_{n=1}^N |y(n)|^2 > \varepsilon \mid H_1\right)$$

$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^N |u_1(n)|^2 > \varepsilon \mid H_0\right)$$

$$= Q\left((\varepsilon - \mu_0)/\sqrt{\sigma_0^2}\right).$$

$\mu_0$ is the expectation for spectrum sensing, and $\mu_0=\sigma_u^2$; $\sigma_0^2$ is the variance for spectrum sensing, and $\sigma_0^2=\sigma_u^4/N$; $\sigma_u^2$ is the variance of noise, $Q(x)$ is complementary cumulative distribution function of the standard normal distribution, and $$Q(x) = \frac{1}{\sqrt{2\pi}} \int_x^\infty \exp(-t^2/2);$$

t is the energy of signal received by the secondary user; N is the number of samples of the primary users; $H_1$ indicates that a main signal s(t) exists; $H_0$ indicates that radio band is not occupied by the primary user; y(n) is a signal as observed after being sampling by the receiver; n is numeral of each sample at the signal receiving end; $\gamma$ is a ratio of the variance of signal to the variance of subspace-filtered noise; $\varepsilon$ is a preset energy threshold; $\tau$ is duration for the spectrum sensing; $f_s$ is a sampling frequency of the secondary user; and $u_1(n)$ is residual noise after subspace filtering.

The real-time occupancy information of bands is obtained based on detection probabilities and false alarm probabilities of the bands.

S103, updating a spectrum resource database of radio environment maps (REM) according to the real-time occupancy information of the bands.

A spectrum indicates the distribution of signal energy to frequencies. A band is a range of the spectrum that is calculated and observed as containing a majority of signal energy. A band can be determined by calculation and visual observation of the spectrum. In other words, a band is a frequency range.

The spectrum resource database of radio environment maps (REM) comprises names, access time, access bands, access routines, geographical locations, and band occupation of users.

It should be noted that the spectrum resource database of radio environment maps (REM) is a database that has been established, in other words, the spectrum resource database of the REM is a preset database.

In addition, by querying and accessing radio environment maps, environmental awareness of cognitive radio network may be enhanced. The cognitive radio network can be trained with past experiences and monitoring results to have self-learning and reasoning abilities. This may facilitate the cognitive radio network's identification of more specific scenarios, so that user-specific and global requirements can be satisfied. The content of the radio environment maps needs to be updated in real time to adapt to changes in radio environment.

A secondary user may obtain a global radio environment map of a base station through network, and then acquire information on positions of nearby signal towers, terrains of the towers' areas, prohibited bands, general distribution of receivers, and available channels, etc. These information can assist the secondary users to select the best spectrum opportunity at optimal transmission power.

Position information and geographic environment information are important components of a radio environment map. Position awareness enables a cognitive radio network to estimate its absolute geographic position (or a relative location relative to a reference node) and determines the accuracy of the position estimation. For implementation of position awareness, a conceptual model of a position awareness engine needs to be established.

Environment awareness enables a cognitive radio network to know the geographical environment of the area where it is located, such that the cognitive radio network is applicable to different application scenarios, such as target recognition, environment recognition, line of sight recognition, non-line of sight recognition, and seamless positioning, etc. Furthermore, the capability of environment awareness can also allow a cognitive radio network to provide location-based services for active spectrum access of a secondary user.

S104, establishing a prediction model for bands occupied by primary users according to the updated spectrum resource database of radio environment maps (REM).

A band occupied by a primary user refers to a range between the lowest frequency point and the highest frequency point of the primary user signal.

In order to describe the spectrum access behavior of the primary user in more detail, detailed processing steps thereof are first described with reference to FIG. 3.

First, upon a primary user's access to spectrum, a search is made in stored REMs for all users whose access time is in proximity to that of the target primary user.

Second, all the users whose access time is in proximity are used for learning. Access users who best accord with the normal access behavior of the primary user are determined according to the proximity in time. A failure in search indicates that the behavior of the primary user are not sufficiently covered, and learning shall be continued to improve the prediction through auto regression.

Then, a nearest neighbor of the user who best accords with the normal access behavior of the primary user is identified. A time interval between these two users are calculated.

The user as identified is then corrected according a correction rule and the user according with an access regularity of the primary user to obtain a similarity solution of a target problem (the target problem is, a primary user occupies a certain band for a specific period).

In the end, the user as identified is reviewed, revised, and assessed for the necessity of retention.

The access behavior of a primary user may be understood as the primary user's access to band in a certain period; and the access regularity of a primary user may be understood as the primary user's routine in access to bands in a specific period.

Specifically, after a target primary user's access to a band is allowed, a search is made in the updated spectrum resource database of radio environment maps (REM) for all users whose access time is in proximity to that of the target primary user. All these users as found are recorded into a set A. The spectrum resource database of radio environment maps (REM) comprises names, access time, access bands, access routines, geographical locations, and band occupation of all users.

All the users in set A are subject to training. Users who best accord with the normal access behavior of the target primary user are determined according to proximity in time, and are recorded into a set B.

The above normal access behavior of a user User may be described with a structure set U:U={Feature,Relation} that is constituted by a feature set Feature and a relation set Relation. The structure set may also comprise other attributes. For example, depending on the regularity of the primary user's access behavior, the structure set may contain weight coefficients, i.e., U:U={Feature,Relation,W}, wherein, W represents a set of weight coefficients. Access features of the primary user are collected.

A determination is made as to whether access behavior of a user in set B obtained through training accords with the access behavior of the primary user.

For clarity, description is provided with reference to the following example.

In the example, if all features of a user User1 match with those of user User2, then $U_1=U_2$, i.e., sets of the two users are the same. If some of features are not the same, then the two users are partially similar. The similarity between the two users can be characterized by a similarity degree Sim.

Sim is defined as a ratio of the matched features of the two users to all their features, thus, $Sim \in [0,1]$. The larger the ratio, the higher the similarity degree between the two users. A ratio equal to "1" indicates that the users are identical, while a ratio equal to "0" indicates that the users are totally different.

A set of any two users may be defined as $V_A=\{a_1,L,a_j,L,a_L\}$, $V_B=\{b_1,L,b_j,L,b_L\}$. Behavior similarity between the two sets can be expressed as:

$$Sim(A, B) = \frac{1}{L}\sum_{j=1}^{L} \sin(a_j, b_j)$$

If spectrum access behavior of the user is not stable, then corresponding weights may be set. Weight coefficients $w_j$ can be introduced into the equation of the behavior similarity as follows:

$$Sim(A, B) = \frac{\sum_{j=1}^{L} \sin(a_j, b_j) w_j}{\sum_{j=1}^{n} w_j}$$

wherein, $$\sin(a_j, b_j) = \begin{cases} 1, a_j = b_j \\ 0, a_j \neq b_j \end{cases}$$

wherein, j represents the numerals of accessing primary users in a day, and L represents the total number of accessing primary users in the day, $\alpha_j$ represents accessing primary users during the day, $\beta_j$ represents accessing primary users corresponding to a specific period stored in REM. If $a_j=b_j$, it is indicated that a current accessing primary user is the same as a primary user stored in the REM, i.e., $\sin(a_j,b_j)=1$; or otherwise, $\sin(a_j,b_j)=0$. In addition, the user may flexibly set the weight $w_j$ as required in practice.

If access behavior of the user in set B obtained through training do not accord with the access behavior of the primary user, the method proceeds back to perform step of, after a target primary user's access to a band is allowed, a search is made in the updated spectrum resource database of radio environment maps (REM) for all users whose access time is in proximity to that of the target primary user.

If access behavior of the user in set B obtained through training accord with the access behavior of the primary user, a search is made in set B for users whose geographic location difference with the target primary user is less than a preset value. These users are recorded into a set C. Time intervals between the target primary user and access bands of users in set C are calculated.

Specifically, the calculation of time intervals between the target primary user and access bands of users in set C may be calculation of time intervals between access band of the target primary user and access band of the user in set C.

The users in set C are corrected according to a correction rule and users according with the access regularity of the target primary user.

It should be noted that, the correction rule may be understood as determining a user in set C that is closest in time to the access band of the target primary user.

An access routine for the target primary user is predicted according to the corrected users in set C.

A prediction model for the bands occupied by primary users is established according to the predicted access routine of the target primary user.

The access routine of a primary user described above may be understood as consideration in terms of time proximity, that is, which primary user is occupying which band.

Figure 3:
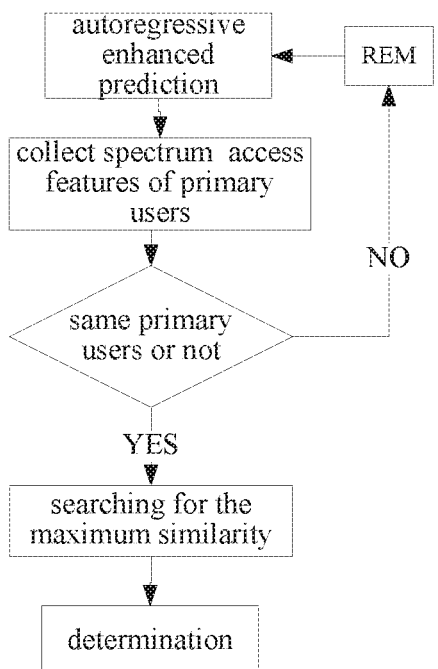
FIG. 3 is a flowchart of predicting a primary user's spectrum access according to an embodiment of the present application.

It should be noted that, as shown in FIG. 3, the above description may also be described as:

searching, according to previous spectrum access features of primary users, for all users whose access time is in proximity to that of the target primary user in the updated spectrum resource database of radio environment maps (REM), and recording all these users into a set A, wherein the spectrum resource database comprises names, access time, access bands, geographical locations and band occupation of all users, and names, access time, access bands, geographical locations and access routines of multiple primary users;

training all the users in set A (also referred to as autoregressive enhanced prediction), collecting spectrum access features of the target primary user according to proximity in time, and recording users whose spectrum access features are similar to those of the target primary user into a set B;

determining, according to the spectrum access features of the primary user, whether there is a user who is "identical" to the target primary user;

if there is no such user, proceeding back to the step of searching, according to previous spectrum access features, in the updated spectrum resource database of radio environment maps (REM) all users whose access time is in proximity to that of the target primary user after a target primary user access the band;

if there is such user, searching, in set B, for a user whose geographic location is closest to that of the target primary user, and calculating a time interval between access band of the target primary user and access band of the closest user in set C;

correcting the users in set B according to a correction rule and users according with access features of the target primary user;

predicting an access routine of the target primary user according to the corrected users in set B; and establishing a prediction model for the bands occupied by primary users according to the predicted access routine of the target primary user.

S105, allowing an access of the secondary user to a target band according to the prediction model for the bands occupied by the primary user.

Specifically, a determination is made, according to the prediction model of the band occupied by the primary user, as to whether the target access band is occupied by any user at access time contained in the access request.

If the target frequency is not occupied, the secondary user's access to the target band is allowed.

If the target frequency is occupied, the method proceeds back to perform step of determining according to the prediction model of the band occupied by the primary user, as to whether the target access band is occupied by any user at access time contained in the access request.

In the method for spectrum prediction in a cognitive radio network as provided by embodiments of the present application, real-time occupancy information of bands can be obtained through a subspace filtering-based spectrum sensing approach. A spectrum resource database of radio environment maps (REM) can be updated according to the real-time occupancy information of bands. A prediction model for bands occupied by primary users is established according to the updated spectrum resource database of radio environment maps (REM). The secondary user can thus access to a target band according to the prediction model for bands occupied by primary users. As such, a secondary user has a targeted spectrum access. The spectrum utilization efficiency of the radio network can be improved.

In addition, with the aid of the radio environment map, the secondary user may know environment information of the cognitive radio network. This can not only effectively reduce secondary users' interference on primary users, but also avoid influence of hidden nodes and exposed nodes. As such, the overall performance of the entire cognitive radio network is improved.

Figure 4:
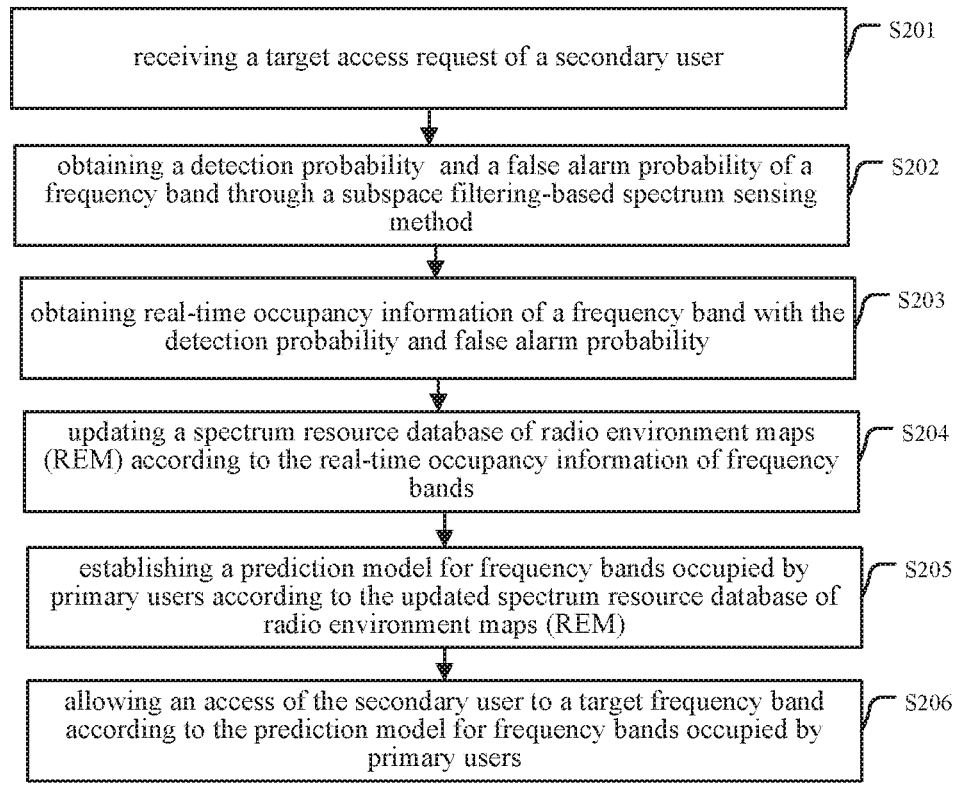
FIG. 4 is a flowchart of another method for spectrum prediction in a cognitive radio network according to an embodiment of the present application.

FIG. 4 is a flowchart of a second method for spectrum prediction in a cognitive radio network according to an embodiment of the present application. The method comprises:

S201, receiving a target access request of a secondary user;

S202, obtaining a detection probability $P_d(\varepsilon, \tau)$ and a false alarm probability $P_f(\varepsilon, \tau)$ of a band through a subspace filtering-based spectrum sensing approach; wherein $$P_d(\varepsilon, \tau) = P\left(\frac{1}{N}\sum_{n=1}^{N}|y(n)|^2 > \varepsilon \mid H_1\right)$$

$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^{N}|u_1(n)|^2 > \varepsilon \mid H_0\right)$$

$$= Q\left((\varepsilon - \mu_0)/\sqrt{\sigma_0^2}\right)$$

$\mu_0$ is an expectation for the spectrum sensing, and $\mu_0 = \sigma_u^2$; $\sigma_0^2$ is a variance for spectrum sensing, and $\sigma_0^2 = \sigma_u^4/N$; $\sigma_u^2$ is a variance of noise; $Q(x)$ is a complementary cumulative distribution function in a standard normal distribution, and $$Q(x) = \frac{1}{\sqrt{2\pi}} \int_x^\infty \exp(-t^2/2);$$

is an energy value of a signal received by the secondary user; N is the number of samples of primary users; $H_1$ indicates a case where a main signal s(t) exists; $H_0$ indicates a case where a radio band is not occupied by the primary users; y(n) is a signal observed after being sampled h a receiver; n is the number of samples at a signal receiving end; γ is a ratio of a variance of the signal to a variance of subspace-filtered noise; ε is a preset energy threshold; τ is duration for spectrum sensing; $f_s$ is a sampling frequency of the secondary user; and $u_1(n)$ is residual noise after the subspace filtering.

S203, obtaining real-time occupancy information of a band with the detection probability and false alarm probability.

S204, updating a spectrum resource database of radio environment maps (REM) according to the real-time occupancy information of bands.

S205, establishing a prediction model for bands occupied by primary users according to the updated spectrum resource database of radio environment maps (REM).

S206, allowing an access of the secondary user to a target band according to the prediction model for bands occupied by primary users.

It can be seen that, in the second method for spectrum prediction in a cognitive radio network provided by an embodiment of the present application, spectrum sensing and radio environment maps (REM) are used in combination to enable a secondary user to have a targeted spectrum access. The spectrum utilization efficiency of the radio network can thus be improved.

In correspondent with the method for spectrum prediction in a cognitive radio network, an embodiment of the present application further provides an apparatus for spectrum prediction in a cognitive radio network.

Figure 5:
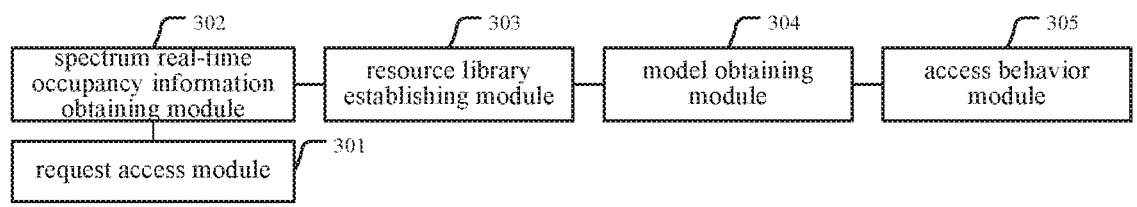
FIG. 5 is a schematic diagram of an apparatus for spectrum prediction in a cognitive radio network according to an embodiment of the present application.

FIG. 5 is a schematic diagram of an apparatus for spectrum prediction in a cognitive radio network according to an embodiment of the present application. The apparatus comprises:

a request access module 301, configured for receiving a target access request from a secondary user;

a spectrum real-time occupancy information obtaining module 302, configured for obtaining real-time occupancy information of bands through a subspace filtering-based spectrum sensing approach;

a resource library establishing module 303, configured for updating a spectrum resource database of radio environment maps (REM) according to the real-time occupancy information of bands;

a model obtaining module 304, configured for establishing a prediction model for bands occupied by primary users according to the updated spectrum resource database of radio environment maps (REM); and an access behavior module 305, configure for allowing an access of the secondary user to a target band according to the prediction model for bands occupied by primary users.

Specifically, the spectrum real-time occupancy information obtaining module 302 comprises:

a detection and false alarm probability obtaining sub-module, configured for obtaining a detection probability $P_d(\varepsilon, \tau)$ and a false alarm probability $P_f(\varepsilon, \tau)$ of a band through a subspace filtering-based spectrum sensing approach; wherein $$P_d(\varepsilon, \tau) = P\left(\frac{1}{N}\sum_{n=1}^{N}|y(n)|^2 > \varepsilon \mid H_1\right)$$

-continued
$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^{N}|u_1(n)|^2 > \varepsilon \mid H_0\right)$$

$$= Q\left((\varepsilon - \mu_0)/\sqrt{\sigma_0^2}\right)$$

$\mu_0$ is an expectation for the spectrum sensing, and $\mu_0 = \sigma_u^2$; $\sigma_0^2$ is a variance for spectrum sensing, and $\sigma_0^2 = \sigma_u^4/N$; $\sigma_u^2$ is a variance of noise; Q(x) is a complementary cumulative distribution function in a standard normal distribution, and $$Q(x) = \frac{1}{\sqrt{2\pi}}\int_x^{\infty} \exp(-t^2/2);$$

t is an energy value of a signal received by the secondary user; N is the number of samples of primary users; $H_1$ indicates a case where a main signal s(t) exists; $H_0$ indicates a case where a radio band is not occupied by the primary users; y(n) is a signal observed after being sampled by a receiver; n is the number of samples at a signal receiving end; γ is a ratio of a variance of the signal to a variance of subspace-filtered noise; ε is a preset energy threshold; τ is duration for spectrum sensing; $f_s$ is a sampling frequency of the secondary user; and $u_1(n)$ is residual noise after the subspace filtering; and a real-time occupancy information obtaining sub-module, configured for obtaining real-time occupancy information of a band with the detection probability and false alarm probability.

The model obtaining module 304 comprises:

a user searching sub-module, configured for, after a target primary user accesses to a band, searching, in the updated spectrum resource database of radio environment maps (REM), for all users whose access time is in proximity to that of the target primary user, and recording all the users as found into a set A, wherein the spectrum resource database comprises names, access time, access bands, geographical locations, access routines and band occupation of all users;

a user confirmation sub-module, configured for training all the users in set A, determining accessing users that best accord with normal access behavior of the target primary user according to proximity in time, and recording the accessing users into a set B;

a first determining sub-module, configured for determining whether access behaviors of users in set B obtained through training accord with the access behavior of the target primary user; if not accord with, activating a first returning sub-module, and if accord with, activating a calculation sub-module;

a first returning sub-module, configure for, returning to the step of after a target primary user accesses to a band, searching, in the updated spectrum resource database of radio environment maps (REM), for all users having access time in proximity to that of the target primary user;

a calculation sub-module, configured for, if access behaviors of users in set B accord with the access behavior of the target primary user, searching, in set B, for users whose geographic location difference with the target primary user is less than a preset value, recording these users into a set C, and calculating time intervals between the access band of the target primary user and access bands of the users in set C;

a correction sub-module, configured for correcting the users in set C according to a correction rule and users according with an access regularity of the target primary user;

a prediction sub-module, configured for predicting an access routine of the target primary user according to the corrected users in set C; and a prediction model establishing sub-module, configured for establishing the prediction model for bands occupied by primary users according to the predicted access routine of the target primary user.

The access behavior module 305 comprises:

a second determining sub-module, configured for determining, according to the prediction model for bands occupied by primary users, whether the target band is occupied by any user at access time contained in the access request; if not occupied, activating a secondary user access sub-module, and if occupied, triggering a second returning sub-module;

a secondary user access sub-module, configured for allowing the access of the secondary user to the target band; and a second returning sub-module, configured for returning to step of determining; according to the prediction model for bands occupied by primary users, whether the target band is occupied by any user at access time contained in the access request.

Figure 6:
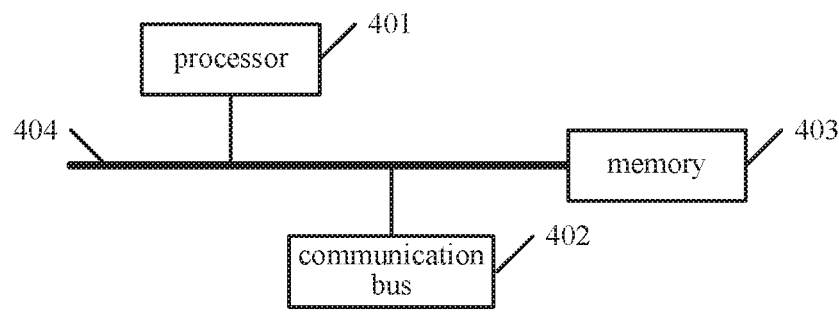
FIG. 6 is a schematic diagram of an electronic device according to an embodiment of the present application.

An embodiment of the present application provides an electronic device. As shown in FIG. 6, the device comprises a processor 401, a communication interface 402, a memory 403 and a communication bus 404, wherein the processor 401, the communication interfaces 402 and the memory 403 are communicatively connected with each other via the communication bus 404.

The memory 403 stores a computer program.

The processor 401 executes the program stored on the memory 403 to perform the following steps:

receiving a target access request from a secondary user;

obtaining real-time occupancy information of bands through a subspace filtering-based spectrum sensing approach;

updating a spectrum resource database of radio environment maps (REM) according to the real-time occupancy information of bands;

establishing a prediction model for bands occupied by primary users according to the updated spectrum resource database of radio environment maps (REM); and allowing an access of the secondary user to a target band according to the prediction model for bands occupied by primary users.

It can be seen that, with the electronic device provided by an embodiment of the present application, spectrum sensing and radio environment maps (REM) are used in combination. This allows a secondary user to have a targeted spectrum access. The spectrum utilization efficiency of the radio network can thus be improved.

Obtaining real-time occupancy information of spectrum by utilizing spectrum sensing approach of subspace filtering described above may be: obtaining, according to the received target access request of the secondary user, the real-time occupancy information of spectrum by utilizing the spectrum sensing approach of subspace filtering.

The implementation of the above related spectrum prediction method for cognitive radio network is the same as the spectrum prediction and promotion method provided by the foregoing method embodiment, and is not described here.

The communication bus aforementioned in the electronic device may be a peripheral component interconnect (PCI) bus or an extended industry standard architecture (EISA) bus and the like. The communication bus can comprise an address bus, a data bus, a control bus, or the like. For ease of depiction, only one thick line is shown in the figure. However, this does not mean there is only one communication bus or one type of communication bus.

The communications interface is used for communication between the aforementioned electronic device and other devices.

The memory may be a random access memory (RAM), or a non-volatile memory (NVM), for example, at least one disk memory. Optionally, the memory may also be at least one storage device remote from the processor described above.

The processor described above may be a general-purpose processor, such as a central processing unit (CPU), a network processor (NP); or a digital signal processor (DSP), an application specific integrated circuit (ASIC), field-programmable gate array (FPGA) or other programmable logic devices, discrete gate or transistor logic devices, discrete hardware components.

An embodiment of the present application provides a computer readable storage medium. The computer readable storage has a computer program stored thereon which, when executed by a processor, causes the processor to perform the method steps:

receiving a target access request from a secondary user;

obtaining real-time occupancy information of bands through a subspace filtering-based spectrum sensing approach;

updating a spectrum resource database of radio environment maps (REM) according to the real-time occupancy information of bands;

establishing a prediction model for bands occupied by primary users according to the updated spectrum resource database of radio environment maps (REM); and allowing an access of the secondary user to a target band according to the prediction model for bands occupied by primary users.

It can be seen that, the application stored in the computer readable storage medium provided by an embodiment of the present application use spectrum sensing and radio environment maps (REM) in combination. This allows a secondary user to have a targeted spectrum access. The spectrum utilization efficiency of the radio network can thus be improved.

The implementation of the above method for spectrum prediction in a cognitive radio network is the same as the methods for spectrum prediction in a cognitive radio network provided by the foregoing embodiments. The detail of which is thus omitted.

It should be noted that the relationship terms herein such as "first", "second" and the like are only used for distinguishing one entity or operation from another entity or operation, but do not necessarily require or imply that there is any actual relationship or order between these entities or operations. Moreover, the terms "comprise", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "comprise(s) a . . . "

do not exclude that there are other identical elements in the processes, methods, articles, or devices which comprise these elements.

All the embodiments are described in corresponding ways, same or similar parts in each of the embodiments can be referred to one another, and the parts emphasized are differences to other embodiments. In particular, for the embodiments of the apparatus, the electronic device, and the computer readable storage medium, since they are similar to the embodiments of the method, the description thereof is relatively simple; the relating parts could refer to the parts of the description of embodiments of the method.

Embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for spectrum prediction in a cognitive radio network, comprising:
receiving a target access request from a secondary user;
obtaining a detection probability $P_d(\varepsilon, \tau)$ and a false alarm probability $P_f(\varepsilon, \tau)$ of a band through a subspace filtering-based spectrum sensing approach; wherein, $$P_d(\varepsilon, \tau) = P\left(\frac{1}{N}\sum_{n=1}^{N}|y(n)|^2 > \varepsilon \mid H_1\right)$$

$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^{N}|u_1(n)|^2 > \varepsilon \mid H_0\right)$$

$$= Q\left((\varepsilon - \mu_0)/\sqrt{\sigma_0^2}\right)$$

$\mu_0$ is an expectation for the spectrum sensing, and $\mu_0 = \sigma_u^2$; $\sigma_0^2$ is a variance for spectrum sensing, and $\sigma_0^2 = \sigma_u^4/N$; $\sigma_u^2$, is a variance of noise; Q(x) is a complementary cumulative distribution function in a standard normal distribution, and $$Q(x) = \frac{1}{\sqrt{2\pi}}\int_x^{\infty}\exp(-t^2/2);$$

t is an energy of a signal received by the secondary user; N is the number of samples of primary users; $H_1$ indicates a case where a main signal s(t) exists; $H_0$ indicates a case where a radio band is not occupied by the primary users; y(n) is a signal observed after being sampled by a receiver; n is the number of samples at a signal receiving end; $\gamma$ is a ratio of a variance of the signal to a variance of subspace-filtered noise; $\varepsilon$ is a preset energy threshold; $\tau$ is duration for spectrum sensing; $f_s$ is a sampling frequency of the secondary user; and $u_1(n)$ is residual noise after subspace filtering;
obtaining real-time occupancy information of a band with the detection probability and false alarm probability;
updating a spectrum resource database of radio environment maps (REM) according to the real-time occupancy information of bands;
establishing a prediction model for bands occupied by primary users according to the updated spectrum resource database of radio environment maps (REM); and
allowing an access of the secondary user to a target band according to the prediction model for bands occupied by primary users.

2. The method of claim 1, wherein, establishing a prediction model for bands occupied by primary users according to the updated spectrum resource database of radio environment maps (REM) comprises:
after a target primary user's access to a band is allowed, searching, in the updated spectrum resource database of radio environment maps (REM), for all users whose access time is in proximity to that of the target primary user, and recording all the users as found into a set A, wherein the spectrum resource database comprises names, access time, access bands, geographical locations, access routines and band occupation of all users;
training all the users in set A, determining accessing users that best accord with normal access behavior of the target primary user according to proximity in time, and recording the accessing users into a set B;
determining whether access behaviors of users in set B obtained through training accord with the access behavior of the target primary user;
if access behaviors of users in set B do not accord with the access behavior of the target primary user, proceeding back to the step of after a target primary user's access to a band is allowed, searching, in the updated spectrum resource database of radio environment maps (REM), for all users whose access time is in proximity to that of the target primary user;
if access behaviors of users in set B accord with the access behavior of the target primary user, searching, in set B, for users whose geographic location difference with the target primary user is less than a preset value, recording these users into a set C, and calculating time intervals between the access band of the target primary user and access bands of the users in set C;
correcting the users in set C according to a correction rule and users according with an access regularity of the target primary user;
predicting an access routine of the target primary user according to the corrected users in the set C; and
establishing the prediction model for bands occupied by primary users according to the predicted access routine of the target primary user.

3. The method of claim 1, wherein, allowing an access of the secondary user to a target band according to the prediction model for bands occupied by primary users comprises:
determining, according to the prediction model for bands occupied by primary users, whether the target band is occupied by any user at access time contained in the access request;
if the target frequency is not occupied, allowing the access of the secondary user to the target band; and
if the target frequency is occupied, proceeding back to step of determining, according to the prediction model for bands occupied by primary users, whether the target band is occupied by any user at access time contained in the access request.

4. An electronic device comprising a processor, a communication interface, a memory and a communication bus, wherein the processor, communication interface and memory are communicatively connected with each other via the communication bus;

the memory has a computer program stored thereon which, when executed by the processor, causes the processor to perform the method steps of claim 1.

5. An apparatus for spectrum prediction in a cognitive radio network, comprising:
- a request access module, configured for receiving a target access request from a secondary user;
- a spectrum real-time occupancy information obtaining module, configured for obtaining a detection probability $P_d(\varepsilon, \tau)$ and a false alarm probability $P_f(\varepsilon, \tau)$ of a band through a subspace filtering-based spectrum sensing approach; wherein, $$P_d(\varepsilon, \tau) = P\left(\frac{1}{N}\sum_{n=1}^{N}|y(n)|^2 > \varepsilon \mid H_1\right)$$

$$= Q\left(\left(\frac{\varepsilon}{\sigma_u^2} - 1 - \gamma\right)\sqrt{\frac{\tau f_s}{2\gamma + 1}}\right)$$

$$P_f(\varepsilon, \tau) = P\left(\frac{1}{N}\sum_{n=1}^{N}|u_1(n)|^2 > \varepsilon \mid H_0\right)$$

$$= Q\left((\varepsilon - \mu_0)/\sqrt{\sigma_0^2}\right)$$

$\mu_0$ is an expectation for the spectrum sensing, and $\mu_0 = \sigma_u^2$; $\sigma_0^2$ is a variance for spectrum sensing, and $\sigma_0^2 = \sigma_u^4/N$; $\sigma_u^2$ is a variance of noise; $Q(x)$ is a complementary cumulative distribution function in a standard normal distribution, and $$Q(x) = \frac{1}{\sqrt{2\pi}}\int_x^{\infty}\exp(-t^2/2);$$

t is an energy of a signal received by the secondary user; N is the number of samples of primary users; $H_1$ indicates a case where a main signal s(t) exists; $H_0$ indicates a case where a radio band is not occupied by the primary users; y(n) is a signal observed after being sampled by a receiver; n is the number of samples at a signal receiving end; $\gamma$ is a ratio of a variance of the signal to a variance of subspace-filtered noise; $\varepsilon$ is a preset energy threshold; $\tau$ is duration for spectrum sensing; $f_s$ is a sampling frequency of the secondary user; and $u_1(n)$ is residual noise after subspace filtering; and
obtaining real-time occupancy information of a band with the detection probability and false alarm probability;
- a resource library establishing module, configured for updating a spectrum resource database of radio environment maps (REM) according to the real-time occupancy information of bands;
- a model obtaining module, configured for establishing a prediction model for bands occupied by primary users according to the updated spectrum resource database of radio environment maps (REM); and
- an access behavior module, configured for allowing an access of the secondary user to a target band according to the prediction model for bands occupied by primary users.

6. The apparatus of claim 5, wherein the model obtaining module comprises:
- a user searching sub-module, configured for, after a target primary user's access to a band is allowed, searching, in the updated spectrum resource database of radio environment maps (REM), for all users whose access time is in proximity to that of the target primary user, and recording all the users as found into a set A, wherein the spectrum resource database comprises names, access time, access bands, geographical locations, access routines and band occupation of all users;
- a user determining sub-module, configured for training all the users in the set A, determining accessing users that best accord with normal access behavior of the target primary user according to proximity in time, and recording the accessing users into a set B;
- a first determining sub-module, configured for determining whether access behaviors of users in the set B obtained through training accord with the access behavior of the target primary user; if not accord with, activating a first returning sub-module, and if accord with, activating a calculation sub-module;
- a first returning sub-module, configure for, proceeding back to the step of after a target primary user's access to a band is allowed, searching, in the updated spectrum resource database of radio environment maps (REM), for all users having access time in proximity to that of the target primary user;
- a calculation sub-module, configured for, searching, in the set B, for users whose geographic location difference with the target primary user is less than a preset value, recording these users into a set C, and calculating time intervals between the access band of the target primary user and access bands of the users in the set C;
- a correction sub-module, configured for correcting the users in the set C according to a correction rule and users according with an access regularity of the target primary user;
- a prediction sub-module, configured for predicting an access routine of the target primary user according to the corrected users in the set C; and
- a prediction model establishing sub-module, configured for establishing the prediction model for bands occupied by primary users according to the predicted access routine of the target primary user.

7. The apparatus of claim 5, wherein the access behavior module comprises:
- a second determining sub-module, configured for determining, according to the prediction model for bands occupied by primary users, whether the target band is occupied by any user at access time contained in the access request; if not occupied, activating a secondary user access sub-module, and if occupied, activating a second returning sub-module;
- a secondary user access sub-module, configured for allowing the access of the secondary user to the target band; and
- a second returning sub-module, configured for proceeding back to step of determining, according to the prediction model for bands occupied by primary users, whether the target band is occupied by any user at access time contained in the access request.

8. A non-transitory computer readable storage medium having a computer program stored thereon which, when executed by the processor, causes the processor to perform the method steps of claim 1.

* * * * *